(12) United States Patent
Nunez Benito et al.

(10) Patent No.: US 7,035,831 B2
(45) Date of Patent: Apr. 25, 2006

(54) REVERSIBLE GENERATION PROCESS OF ALTERED PAYMENT CARD BY MEANS OF A MATHEMATICAL ALGORITHM

(75) Inventors: Ana Nunez Benito, Madrid (ES); Jose Antonio Gallego Gonzalez, Madrid (ES)

(73) Assignee: Servicios Para Medios de Pago, S.A., Madrid (ES)

(*) Notice: Subject to any disclaimer, the term of this patent is extended or adjusted under 35 U.S.C. 154(b) by 450 days.

(21) Appl. No.: 10/257,087

(22) PCT Filed: Jan. 31, 2002

(86) PCT No.: PCT/ES02/00048

§ 371 (c)(1),
(2), (4) Date: Oct. 7, 2002

(87) PCT Pub. No.: WO03/065255

PCT Pub. Date: Aug. 7, 2003

(65) Prior Publication Data

US 2003/0208450 A1    Nov. 6, 2003

(51) Int. Cl.
*G06Q 40/00* (2006.01)

(52) U.S. Cl. .................. 705/65; 380/28; 380/29; 708/100; 705/64; 705/50; 705/66; 705/67; 705/75; 705/76; 705/79

(58) Field of Classification Search .............. 705/50, 705/64–79; 380/28, 29; 708/100
See application file for complete search history.

(56) References Cited

U.S. PATENT DOCUMENTS

2001/0032192 A1* 10/2001 Putta et al. .................. 705/76

FOREIGN PATENT DOCUMENTS

| EP | 0354771 | * | 2/1990 |
|----|---------|---|--------|
| WO | WO 99/49424 | | 9/1999 |
| WO | WO 01/67355 | | 9/2001 |
| WO | WO 01/84509 | | 11/2001 |
| WO | WO 01/99070 | | 12/2001 |

OTHER PUBLICATIONS

Stiles, "Credit Card Validation-Check Digits", Feb. 25, 1997.*
Mohr, "Check Digits", 1999.*

* cited by examiner

*Primary Examiner*—James P. Trammell
*Assistant Examiner*—Jalatee Worjloh
(74) *Attorney, Agent, or Firm*—Merchant & Gould P.C.

(57) ABSTRACT

The process consists of carrying out the first phase of generating the transaction signature (9), with prior authentication by the cardholder, in the issuing centre (3) through its authentication server (5), a second phase of decimalising (10) the signature (9) to obtain a valid permutation number and a third phase of permuting (11) the intermediary positions or digits of the card, the processor fixing a BIN and maintaining the check digit. In this way, the digits forming the expiry date are permuted. The card and expiry date are sent in the data flow (12) of the transaction to the acquiring server (7), from where they are sent back to the issuing centre (3), to its processing centre (6) to be specific, where three other operative phases are carried out: the new generation of the signature (13), its decimalisation (14) and lastly the inverse process (15) to reestablish the card's real data and expiry date.

19 Claims, 5 Drawing Sheets

REVERSIBLE GENERATION PROCESS OF ALTERED PAYMENT CARD BY MEANS OF A MATHEMATICAL ALGORITHM

OBJECTIVE OF THE INVENTION

The objective of the invention is to obtain an altered card. By this is meant the result of the application of a determined process to a payment card number in order to alter its number and its date of expiry and thus be able to openly transmit said number over various networks, such as the Internet® and specific payment networks, etc., in the authorisation of transactions.

So the objective of the invention is to make the transaction secure given that the information on the original card will not be accessible to third persons. By doing so it will be impossible to use the information fraudulently at a later date.

The invention is particularly recommended for E-commerce transactions carried out over the Internet®.

The basic process of the proposed invention consists of the authorisation of a reversible mathematical algorithm, whose objective is to permute the digits of the payment card number and change the expiry date.

This algorithm is independent and open to the rest of the processes that take place in transactions authorising means of payment. It is an algorithm that, in order to be valid, further requires the concurrence of the following characteristics of the card:

The altered card, with its expiry date altered, must appear to be a normal card with a normal expiry date.

The altered card's BIN must be globally recognised and belong to the habitual processing centre of the original payment card.

The length of the altered card must be equal to that of the original.

The altered card's number must be specific to the transaction.

The altered card's number must be unpredictable.

The system that implements this process must be sound so that it can detect any unauthorised attempt to use it by third persons.

BACKGROUND OF THE INVENTION

As we all know, all payment cards have a determined number of digits. Some of those at the front form the "BIN", which identifies the issuing body of the card, the following digits form the intermediary data, with the exception of the last one, which normally corresponds to the "Check-Digit". The expiry date is also used as a means of identifying the card.

Whenever the card is used in a commercial operation, in particular over the Internet®, but also when using other networks where specific means of payment are required, the card's true data is exposed to the net, thereby becoming accessible to third persons, and running the perfectly possible, and even frequent, risk of being used at a later date in a fraudulent manner to acquire goods or services, delivering them to a third person, in the name of the cardholder whose specific data is known.

There are various methods that use ciphering, encoding, concealment, etc. of the card number to prevent the payment card's true number from being intercepted.

For example, one of the most important of these is described under European Patent publication number 1 029 311, and is based on a set of valid credit card numbers with one of them being the master, the one that actually works, and at least one more of limited usage, which is connected to the master and which is the number actually sent over communication networks or the Internet®.

This limited usage number is deactivated with a code that can be activated with different aims; for a single transaction, for a limited period of time, for a limited amount of money, etc . . .

DESCRIPTION OF THE INVENTION

The reversible generation process of altered payment cards by means of a mathematical algorithm proposed by the invention resolves the problems stated above in a completely satisfactory manner whereby the data exposed to the net is not the card's true data but data encrypted by means of the mathematical algorithm mentioned above, which is not valid for later operations since the alteration of said data is specific to each transaction and differs from one transaction to another.

To be more specific, once the customer has decided on the true payment card, the following operation steps or phases are laid down:

The Issuing Authentication Server generates the transaction signature, with prior authentication of the payment cardholder.

The Issuing Authentication Server decimalises the transaction signature to obtain a valid permutation number, depending on the number of positions to be permuted within the payment card number.

The payment card's intermediary digits are permuted, fixing a BIN with a processor and keeping the payment card's Check-Digit. The original payment card's expiry date is changed and is used as the expiry date of the altered payment card.

The altered card obtained using the process above is sent in the data flow of the transaction of means of payment to make the corresponding authorisation request in the Processing Centre of the Issuing Body with this altered card, instead of with the original.

The Processing Centre of the Issuing Body generates the transaction signature using the same process the Authentication Server used in the first step.

Thus the decimalisation of the transaction signature is calculated in the same way as in the second step.

Since the process is reversible, to obtain the expiry date of the true card the expiry date of the altered card is recuperated using the inverse process. In the same way the inverse permutation of the one carried out in the third step is carried out to put each digit of the altered payment card back in their original positions on the real card.

Next normally comes the Processing Centre of the Issuing Body, paying special attention to generating the altered number every time it is necessary throughout the lifecycle of the transaction of payment means, such as Applications for copies, Setbacks, etc.

SPECIFICATION OF THE DRAWINGS

To complement this specification and with the aim of helping the reader to gain a better understanding of the invention's characteristics, in accordance with a prior example of its practical usage, as an integral part of said specification a set of drawings is attached where the following is represented in an illustrative and non-limited manner.

PROMINENT REALISATION OF THE INVENTION

Figure 1:
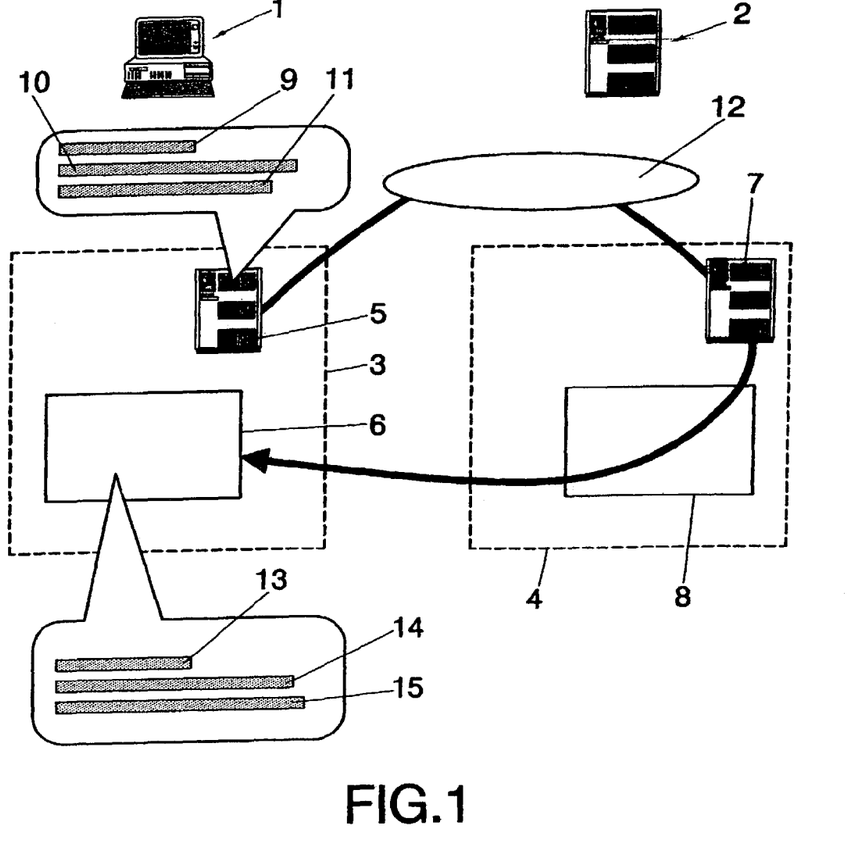
FIG. 1—Shows a typical diagram of a transaction of payment means over the Internet® and the elements of the different steps of the process put forward by the invention.

In the figure outlined reference has been made to (1) the cardholder's computer, to (2) the business, to (3) the issuing authority, to (4) the acquiring authority and within (1) the authentication server of the issuer (5) and the processing centre of the issuing body (6) and within (2) the acquiring server (7) and the processing centre of the acquiring body (8).

In line with the invention's process the cardholder chooses a payment card to make a payment by means of the normal methods, i.e. in the authentication server (5) of the issuing body or authority (3), with prior authentication by the cardholder, where said issuing body (3) is solely responsible for the method employed and the processes carried out, which do not form part of the process of the invention.

Figure 2:
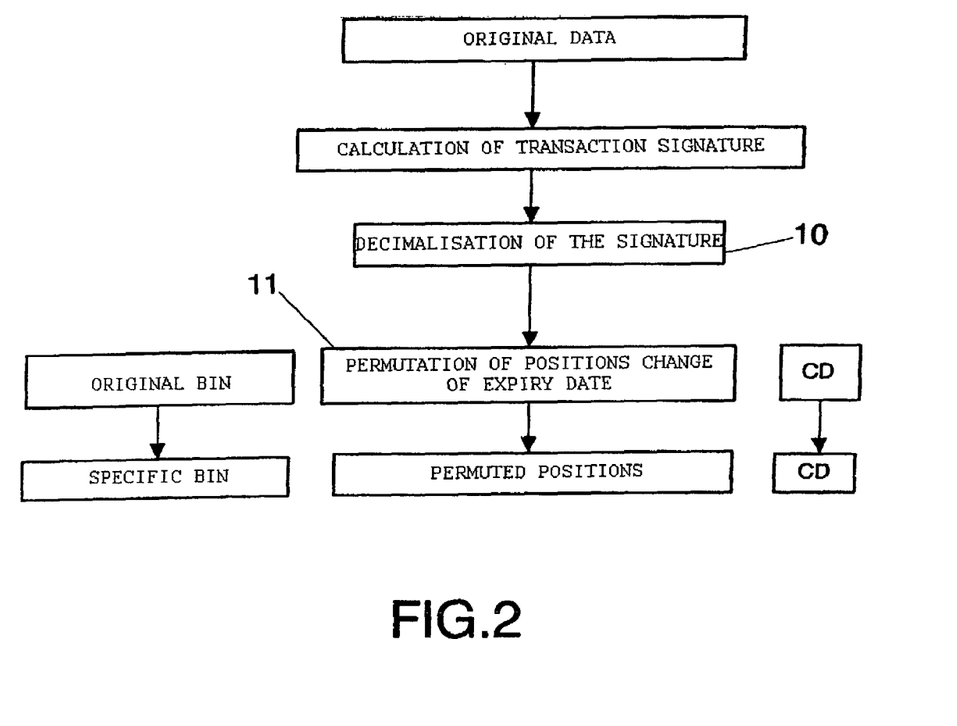
FIG. 2—Shows a flow diagram indicating the stages in the process that the original number of the credit card undergoes in the authentication server of the issuing body or authority to obtain the altered number.

In said authentication server (5) of the issuer the first three phases or steps of the process are carried out, specifically the signature step (9), the decimalisation step (10) and the permutation step (11).

Step (9), i.e. the transaction signature, will be generated by the Issuing Server in the usual way, taking into account that it must be different in every transaction and making sure that the transaction's sensitive data is not handled at any moment.

It is recommended that at least the following should be signed digitally: the Amount of the transaction, the Order Identification Number within the business, the Company Identification Code, the Currency of the Transaction and a secret key known only to the issuer.

The real card's number and its expiry date must have no part in calculating the transaction signature. The remaining fields used to generate the transaction signature must make the same journey in the payment means transaction flow with the exception of the secret key. This assures a correct diversification when generating the signature, given that the data changes in each transaction.

The method used to generate the signature is open but hash SHA-1 is recommended.

Once the transaction signature has been generated according to step (9) above, we will proceed in obtaining (10) a decimal number that will monosemously determine the permutation to be applied to the original payment card's number.

Depending on the card's length it will be necessary to choose at random a few positions of the characters that make up the signature obtained in the previous step.

To carry out this process we have pointed out three basic parts of the card number:

Bin: Normally the six first positions of the payment card number.

Intermediary digits: The remaining digits minus the last one.

Check Digit: The last digit.

Example: If the original card number were 1234567890123456, the three parts would be as follows:

| 123456 | 789012345 | 6 |
|---|---|---|
| BIN | Intermediary Data | CD (Check Digit) |

Depending on the number of intermediary digits that are going to be permuted, we will have to take as many digits as there are of the signature (N), in such a way that N is the largest whole number that makes 256**N (256 to the power of N) less than the number of permutations (P). P is obtained as a result of the number of intermediary positions (T), i.e. T! (T factorial), or in other words:

$$P=1\times2\times3\times4\times \ldots \times (T-1)\times T.$$

Lastly a multiplier factor F will be determined. This will be the integral part of the result of the division of the number of permutations P by 256**N.

i.e. $F=$Integral $[P/(256**N)]$

Example: Taking the 16-digit card number above as an example and eliminating the 6 digits of the BIN and the Check Digit we are left with 9 intermediary digits, i.e. T=9, and thus the number of possible permutations will be:

$$P=9!=1\times2\times3\times4\times5\times6\times7\times8\times9=362880.$$

Given that 2562=65536 and 2563=16777216, then N=2, which will be the random positions that must be taken from the transaction signature.

The multiplier factor F will be the integral part of 362880/(256**2)=5.

The decimalisation of the transaction signature to be used to determine the permutation to be carried out will be the number resulting in base 10 of the random positions of the signature taken in base 16 (Hexadecimal) and multiplying by F. To the result 1 is added to avoid 0, which would be the identity permutation where no digit would be permuted.

Thus we assure that the decimalisation of the N positions of the signature will never be greater than the maximum number of possible permutations P for the number T of intermediary positions. The multiplier factor F only distributes the resulting number uniformly amongst the different possibilities.

After applying the algorithm specified we would obtain a decimal number between 1 and P that will be the decimalisation of the transaction signature. (In the example it would be a number between 1 and 362880).

The next operative phase, the permutation step (11), is carried out in the following way:

The BIN of the original card is substituted by another BIN specified by the issuer, which may be the same one or a different one, the only condition being that it must be globally recognised so that the transactions started with cards belonging to that BIN be correctly directed to that Issuer.

The intermediary positions between the BIN and the check digit will be the ones that undergo the actual permutation according to the process explained below:

The decimalised value of the transaction signature is divided by the number of positions to be altered T and to the remainder of said quotient 1 is added, obtaining a value between 1 and T, that will determine the position of the number of the original payment card, whose value we will transfer to the first position of the number of the permuted payment card.

Next, the quotient above is divided by (T−1) and to the remainder is added 1 obtaining a value between 1 and T−1 that will determine the position to be permuted of the remaining number of the original payment card (once the permuted position from the previous step has been eliminated), whose value is transferred to the second position of the number of the permuted payment card.

This process continues until there are no remaining positions in the number of the original payment card, i.e. it is carried out iteratively T times.

The payment card number obtained in this way will be the intermediary positions of the altered payment card.

The Check-Digit, which occupies the last position of the original payment card does not undergo any change and is transferred intact to the last position of the number of the altered payment card.

Figure 3:
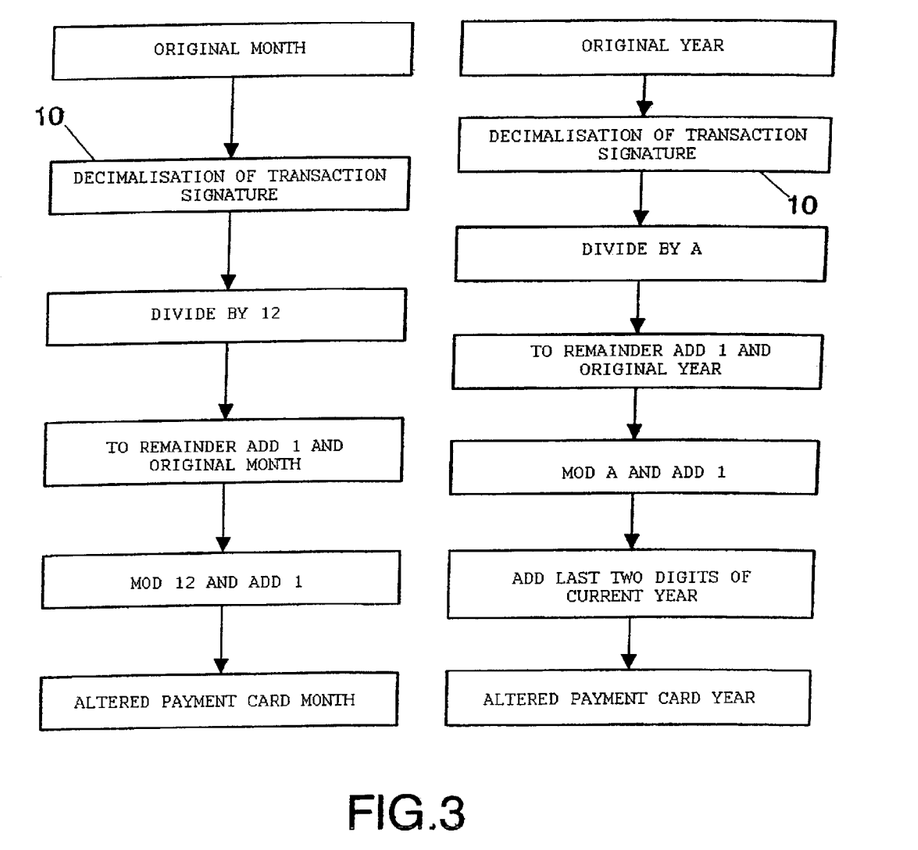
FIG. 3—Shows a flow diagram indicating the stages in the process that the credit card's original month and year undergo in the processing centre of the issuing body or authority to obtain the altered month and year.

To obtain the expiry date of the altered payment card the following steps are necessary:

The expiry date of the payment cards is divided into four positions, two for the month MM and two for the year YY.

To obtain the month of the altered payment card, the number resulting from the decimalisation of the signature is divided by 12 and to the remainder 1 and the month of the original card are added. This number is again divided by 12 and 1 is added to the remainder, thus obtaining the month of the altered payment card. I.e.

Permuted $MM$=[Decimalisation of the signature mod 12+1+original $MM$]mod 12+1

To obtain the year of the altered card, first the issuer decides on the two-year window it is going to work with, this number being the number of years from the current year that can be obtained in the process. This value will be A. For example, if the current year is 2001 and a window of 15 years is required, then the years resulting from the process will be between 02(2002) and 17(2017).

Next the number resulting from the decimalisation of the signature is divided by A and to the remainder 1 and the year of the original payment card are added. This number is divided by 12 again and to the remainder 1 and the last two digits of the current year are added, thus obtaining the year of the altered payment card. I.e.

Permuted $YY$=[(Decimalisation of the signature mod A+1+original $YY$] mod A+1+current $YY$ The next step in the process, referred to as (12) in FIG. 1, specifically the fourth step, consists of sending the data, the altered data to be specific, from the issuer's authentication server (5) to the acquirer's server (7), as a substitute for the original data, in order to carry out the corresponding authorisation order at the issuing body's processing centre (6), as is also shown in FIG. 1.

Figure 4:
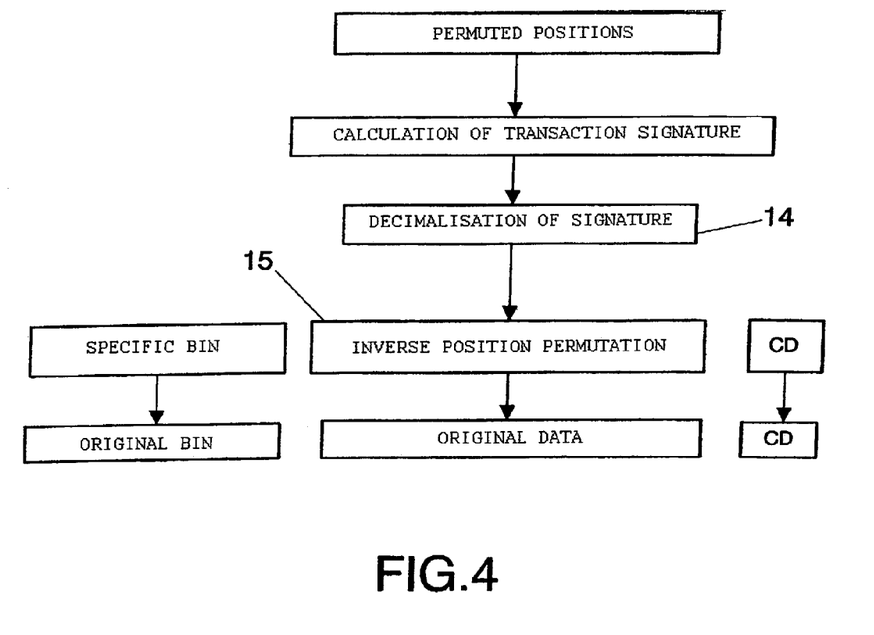
FIG. 4—Shows a flow diagram indicating the stages in the process that the altered credit card number undergoes in the processing centre of the issuing body or authority to obtain the original number.
Figure 5:
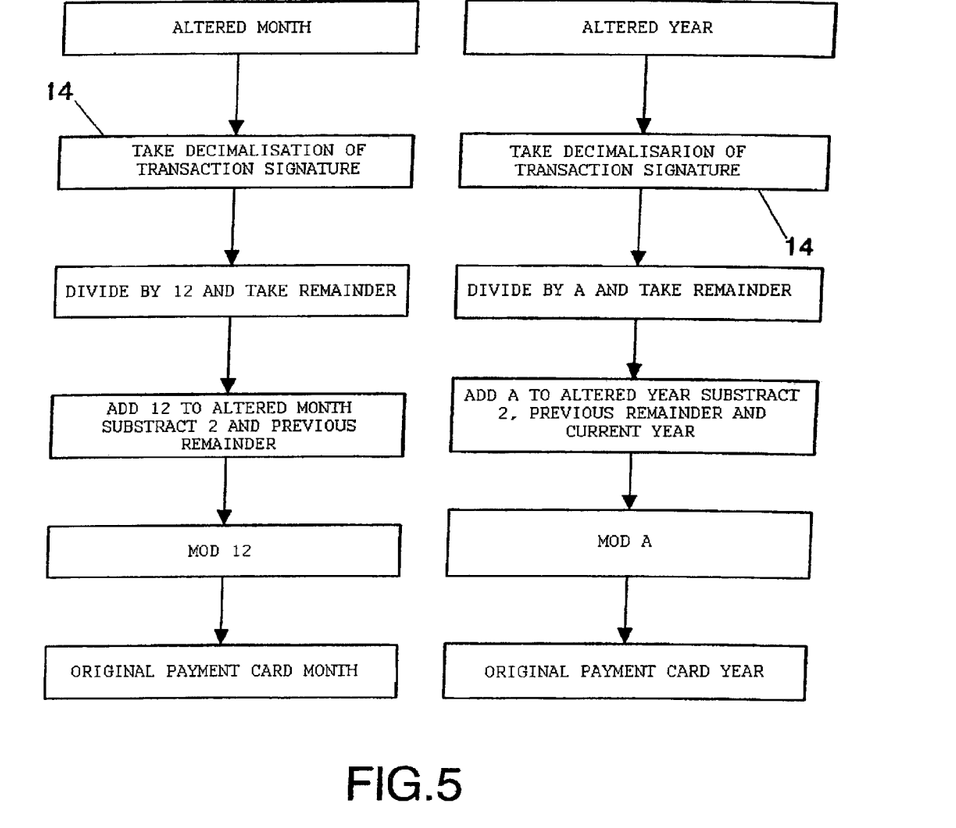
FIG. 5—Shows a flow diagram indicating the stages in the process that the altered credit card's month and year undergo in the processing centre of the issuing body or authority to obtain the original month and year.

In said processing centre (6) of the issuing body or authority (3), the last three steps of the process are carried out, specifically the decimalisation (14) signature (13) and the reverse process (15).

To obtain the transaction signature in step (13), the processing centre (6) of the issuing body generates the transaction signature using the same process as the authentication server (5) in step (9).

To this end the Processing Centre of the Issuing Body takes the specific data from the transaction flow, taking into account that it must be the data used when the signature was generated in step (9) by the Issuer's Authentication Server (5) (e.g. Amount of the transaction, Order Identification Number within the business, Business Identification Code, Transaction Currency).

Likewise the secret key the Authentication Server also has and which obviously does not make the journey in the transaction flow should be used.

Lastly, the algorithm that the transaction signature generates should be the same. (E.g. SHA-1)

For the decimalisation phase (14), the decimalisation of the transaction signature is also calculated, in exactly the same way as it was calculated in step (10), bearing in mind that this should be the same two random positions, positions that are known only to the issuing body or authority (3).

Lastly and in order to carry out phase (15) of the inverse process of the card number, the BIN of the altered card will be substituted by the original one and the intermediary positions between the BIN and the Check Digit will be the ones that will actually undergo the following inverse permutation process:

The decimalised value of the transaction signature is divided by the number of positions to be altered T and to the remainder of said quotient 1 is added, obtaining a value between 1 and T, which will determine the position of the number of the original payment card we will put the first digit of the number of the altered payment card.

Next the quotient above is divided by (T−1) and to the remainder 1 is added obtaining a value between 1 and T−1 that will determine the position to be permuted of the remaining number of the original payment card (once the permuted position in the previous step has been eliminated), whose value will be in the second position of the number of the permuted payment card.

This process continues until there are no more positions, i.e. it is carried out iteratively T times.

The payment card number obtained this way will be the intermediary digits of the original payment card.

The Check-Digit that occupies the last position of the altered payment card does not change at all and is transferred intact to the last position of the original payment card number.

To obtain the expiry date of the original payment card the following steps should be carried out:

The expiry date of the altered payment cards, as in the original cards, has four positions, two for the month MM and two for the year YY.

To obtain the month of the original payment card 12 units are added to the month of the altered card and then 2 units and the remainder of the number resulting from the transaction signature divided by 12 are subtracted. This number is divided by 12 and the remainder is the month of the original payment card. I.e.

Original $MM$=[Permuted $MM$+12−2−Decimalisation of the signature mod 12] mod 12

To obtain the year of the original payment card A is added to the year of the altered card and then 2 units, the remainder of the number resulting from the decimalisation of the transaction signature divided by A and the last two positions of the current year are subtracted. I.e.

Original YY=[Permuted YY+A−2−Decimalisation of signature mod A−current YY] mod A

PRACTICAL EXAMPLE OF INVENTION

Original card—494000 123456789 7
Original expiry date—May 3
Specific BIN—494055
Window of years for calculating expiry—15
Since the card has 9 intermediary positions, T=9
Random signature positions for decimalisation—4 and 9
Transaction order amount—5234
Transaction order number—123456
Business number—999008881
Transaction currency 978 (euros)
Issuer's secret key for calculating signature—qwertyasdf0123456789

Step 1: Obtaining the Transaction Signature
To calculate the transaction signature we apply the algorithm SHA-1 to the chain:
Order amount+Order number+Business identification+Currency+Secret key. The result is the following hexadecimal:

09 FD 78 D4 0B 0C 6A AA 45 5C 2D D8 16 85 CC 11 04 3B CD

Step 2: Decimalisation of the Transaction Signature
The three basic parts of the card number are the following:

| 494000 | 123456789 | 7 |
|--------|-----------|---|
| BIN | Intermediary Data | CD (Check Digit) |

Number of positions in the signature that must be taken: Since T is equal to 9, P=9!=362880. Once you have P, to calculate the number of positions necessary we raise 256 to different whole numbers until we find the greatest one that makes the result of raising 256 to it less than P. In this case we have 2562=65536, which is less than P, so we calculate 2563, which gives us 16777216. As this is already greater than P, the greatest whole number that fulfils the condition stated above is 2, meaning that N will be equal to 2.
The 2 random positions of SHA-1 are chosen: 4 and 9 (D4 and AA)

Multiplier Value: $F=P/(256N)=362880/(2562)=5$

Decimal value: We calculate the decimal value of D4AA, which are the corresponding values to positions 4 and 9 in the transaction signature.

Decimal value=(13*16**3+4*16**2+10*16+10)*5+1=54442*5+1=272211.

Step 3: Permutation of the Payment Card Number and Changing the Expiry Date.
3.1.1. The original BIN, 494000, is substituted by the specific BIN, 494055
3.1.2. Calculation of the permutation:
Step 1—We calculate the position on the original card we should place in the first position on the altered card:

272211/9=30245*9+6. Take the remainder 6+1=7

Step 2—We calculate the position on the original card from the ones remaining we should place in the second position on the altered card:

30245/8=3780*8+5. Take the remainder 5+1=6

Step 3—We calculate the position on the original card from the ones remaining we should place in the third position on the altered card:

3780/7=540*7+0. Take the remainder 0+1=1

Step 4—We calculate the position on the original card from the ones remaining we should place in the fourth position on the altered card:

540/6=90*6+0. Take the remainder 0+1=1

Step 5—We calculate the position on the original card from the ones remaining we should place in the fifth position on the altered card:

90/5=18*5+0. Take the remainder 0+1=1

9

Intermediary data of the original card:

| 1 | 2 | 3 | 4 | 5 | 6 | 7 | 8 | 9 |

X X 1 2 3 X X 4 5

Intermediary data of the altered card:

| 7 | 6 | 1 | 2 | 3 | | | | |

Step 6—We calculate the position on the original card from the ones remaining we should place in the sixth position on the altered card:

18/4=4*4+2. Take the remainder 2+1=3

Intermediary data of the original card:

| 1 | 2 | 3 | 4 | 5 | 6 | 7 | 8 | 9 |

X X X 1 2 X X 3 4

Intermediary data of the altered card:

| 7 | 6 | 1 | 2 | 3 | 8 | | | |

Step 7—We calculate the position on the original card from the ones remaining we should place in the seventh position on the altered card:

4/3=1*3+1. Take the remainder 1+1=2

Intermediary data of the original card:

| 1 | 2 | 3 | 4 | 5 | 6 | 7 | 8 | 9 |

X X X 1 2 X X X 3

Intermediary data of the altered card:

| 7 | 6 | 1 | 2 | 3 | 8 | 5 | | |

Step 8—We calculate the position on the original card from the ones remaining we should place in the eighth position on the altered card:

1/2=0*3+1. Take the remainder 1+1=2

Intermediary data of the original card:

| 1 | 2 | 3 | 4 | 5 | 6 | 7 | 8 | 9 |

X X X 1 X X X X 2

Intermediary data of the altered card:

| 7 | 6 | 1 | 2 | 3 | 8 | 5 | 9 | |

Step 9—We calculate the position on the original card from the ones remaining we should place in the ninth position on the altered card:

Value 1 is taken

Intermediary data of the original card:

| 1 | 2 | 3 | 4 | 5 | 6 | 7 | 8 | 9 | x x x 1 x x x x x

Intermediary data of the altered card:

| 7 | 6 | 1 | 2 | 3 | 8 | 5 | 9 | 4 |

The intermediary positions of the altered card obtained are:

761238594

3.1.2. The Check Digit does not change.
The altered card obtained is the following:

| BIN | | | | | | INTERMEDIARY DATA | | | | | | | | CD |
|---|---|---|---|---|---|---|---|---|---|---|---|---|---|---|
| 4 | 9 | 4 | 0 | 5 | 5 | 7 | 6 | 1 | 2 | 3 | 8 | 5 | 9 | 4 | 7 |

3.2.1. To calculate the month of the altered card: We use the decimal value calculated before (272211):
We calculate modulus 12 of the decimal value:

272211/12=22684*12+3. The remainder is 3.

To the remainder above we add 1 and the month of the original card:

3+5+1=9.

We calculate modulus 12 of the result and add 1:

9/12=0*12+9. The remainder is 9.

9+1=10. The month of the altered card is 10.

3.2.2. To calculate the year of the altered card: We use the decimal value calculated before (272211):
Since A=15, we calculate modulus 15 of the decimal value:

272211/15=18147*15+6. The remainder is 6

To the remainder we add 1 and the year of the original card:

6+3+1=10.

We calculate modulus 15 of the result and add 1 and the last two positions of the current year. In this case the current year is 2001, so the last two positions are 01:

10/15=0*15+10. The remainder is 10.

10+1+01=12. The year of the altered card is 12.

Step 4. Sending the Altered Card in the Transaction's Data Flow.
In the transaction flow the following pieces of data, amongst others, make the journey:
Altered card to be used in the transaction: 494055 7612348594 7
Altered card's expiry date to be used in the transaction: October 12
Transaction order amount—5234
Transaction order number—123456
Identifying code of the business—999008881
Currency of the transaction—978 (euros)

Step 5. Obtaining the Transaction Signature

To obtain the transaction signature we repeat Step 1 using the data that go in the transaction flow and the secret key that the Processing Centre of the Issuing Body and the Authentication Server both have.

The transaction signature in SHA-1 calculated in this step must be the same as the one calculated in Step 1:

09 FD 78 D4 0B 8A 0C 6A AA 45 5C 2D D8 16 85 CC 11 04 3B CD

Step 6. Decimalisation of the Transaction Signature.

Step 2 is repeated to obtain the decimal value: 272211

Step 7. Inverse Process.

7.1.1. The specific BIN, 494055, is substituted by the original BIN, 494000.

7.1.2. Calculation of the permutation:

Step 1—We calculate the position on the original card where we should place the value of the first position of the altered card:

272211/9=30245*9+6. Take the remainder 6+1=7

Step 2—We calculate the position on the original card from the ones remaining where we should place the value of the second position of the altered card:

30245/8=3780*8+5. Take the remainder 5+1=6

Step 3—We calculate the position on the original card from the ones remaining where we should place the value of the third position of the altered card:

3780/7=540*7+0. Take the remainder 0+1=1

Step 4—We calculate the position on the original card from the ones remaining where we should place the value of the fourth position of the altered card:

540/6=90*6+0. Take the remainder 0+1=1

Step 5—We calculate the position on the original card from the ones remaining where we should place the value of the fifth position of the altered card:

90/5=18*5+0. Take the remainder 0+1=1

Step 6—We calculate the position on the original card from the ones remaining where we should place the value of the sixth position of the altered card:

18/4=4*4+2. Take the remainder 2+1=3

Step 7—We calculate the position on the original card from the ones remaining where we should place the value of the seventh position of the altered card:

4/3=1*3+1. Take the remainder 1+1=2

Step 8—We calculate the position on the original card from the ones remaining where we should place the value of the eighth position of the altered card:

1/2=0*3+1. Take the remainder 1+1=2

Intermediary data of the original card:

| 1 | 2 | 3 |   | 5 | 6 | 7 | 8 | 9 |

| X | X | X | 1 | X | X | X | X | 2 |

Intermediary data of the altered card:

| 7 | 6 | 1 | 2 | 3 | 8 | 5 | 9 | 4 |

Step 9—We calculate the position on the original card from the ones remaining where we should place the value of the ninth position of the altered card:
Value 1

Intermediary data of the original card:

| 1 | 2 | 3 | 4 | 5 | 6 | 7 | 8 | 9 |

| X | X | X | 1 | X | X | X | X | X |

Intermediary data of the altered card:

| 7 | 6 | 1 | 2 | 3 | 8 | 5 | 9 | 4 |

The intermediary data of the original card obtained are: 123456789

7.1.3. The Check Digit does not change.
The original card recovered is the following:

| BIN | | | | | | INTERMEDIARY DATA | | | | | | | | | CD |
|---|---|---|---|---|---|---|---|---|---|---|---|---|---|---|---|
| 4 | 9 | 4 | 0 | 0 | 0 | 1 | 2 | 3 | 4 | 5 | 6 | 7 | 8 | 9 | 7 |

7.2.1. To calculate the original month: We use the decimal value calculated before (272211):
We calculate modulus 12 of the decimal value:

272211/12=22684*12+3. The remainder is 3.

We add 12 to the altered month and subtract 2 and the previous result:

10+12−2−3=17.

We calculate modulus 12:

17/12=1*12+5. The remainder is 5.

The original month is 05.
7.2.2. To calculate the original year: We use the decimal value calculated before (272211):
Since A=15, we calculate modulus 15 of the decimal value:

272211/15=18147*15+6. The remainder is 6.

We add 15 to the year of the altered card and subtract 2, the previous result and the last two positions of the current year:

12+15−2−6−01=18.

We calculate modulus 15:

18/15=1*15+3. The remainder is 3.

The original year is 03.

The invention claimed is:

1. A reversible generation process of altered payment cards by a mathematical algorithm, for Ecommerce transactions carried out over the Internet, and using cards furnished with a determined payment card number, comprising a BIN in the first positions, intermediary positions and a final digit referred to as the "Check Digit" and data corresponding to the expiry date, once the customer has decided on the real payment card, wherein:

An Authentication Server of an issuer generates a transaction signature with prior authentication by a payment cardholder;

The Authentication Server of the issuer carries out the decimalisation of the transaction signature to obtain a valid permutation number according to the number of positions to be permuted on the payment card number;

The payment card's intermediary digits are permuted by fixing of a BIN by a processor and maintaining the Check Digit of the payment card and at the same time by changing the payment card's expiry date, which is used as the altered card's expiry date;

The altered card is sent in the data flow of the transaction of the means of payment to carry out the corresponding authorisation request in a processing centre of the issuer instead of with the original, through an acquiring server;

The processing centre of the issuer generates the transaction signature by the same process as the authentication server in the first step;

the decimalisation of the transaction signature is calculated in the same way as in the second step;

the expiry date of the real card is obtained by the inverse process of changing the altered card's expiry date to put each digit of the altered payment card number back in the initial positions on the original card carrying out the inverse permutation process (15) of the process carried out in the third step to put each digit of the altered payment card number back in the initial positions on the original card;

the processing centre of the issuer generates the altered number when necessary in the lifecycle of the transaction.

2. The process of reversible generation of altered payment cards by means of a mathematical algorithm, according to claim 1, wherein the altered card and its altered expiry date must appear to be the original card and expiry date.

3. The process of reversible generation of altered payment cards by a mathematical algorithm, according to claim 1, wherein the BIN of the altered card is globally recognised and belongs to the habitual processing centre of the original payment card.

4. The process of reversible generation of altered payment cards by a mathematical algorithm, according to claim 1, wherein the length of the altered card must be equal to the original.

5. The process of reversible generation of altered payment cards by a mathematical algorithm, according to claim 1, wherein the number of the altered card is specific to each transaction.

6. The process of reversible generation of altered payment cards by a mathematical algorithm, according to claim 1, wherein the number of the altered card is unpredictable.

7. The process of reversible generation of altered payment cards by a mathematical algorithm, according to claim 1, wherein the system that overlooks the process detects any fraudulent attempt at using it by third persons.

8. The process of reversible generation of altered payment cards by a mathematical algorithm, according to claim 1, wherein the decimalisation of the transaction signature comprises:

Depending on the number of intermediary positions to be permuted, as many positions (N) of the signature are taken so that N is the largest whole number that makes 256*N (256 to the power of N) less than the number of permutations (P) of the number of intermediary positions (T), i.e. T!, A multiplier factor F is determined, which is the whole part of the result of the division of the number of permutations (P) by 256*N, i.e. F=Whole Part [P/(256*N)], The decimalisation of the transaction signature used to determine the permutation necessary is the result, in base 10, of the N random positions of the signature in base 16 (hexadecimal), multiplied by factor F and adding 1 to the result to prevent the value from being 0, which would be the identity permutation and would not allow the permutation of any digit.

9. The process of reversible generation of altered payment cards by a mathematical algorithm, according to claim 8, wherein the decimalisation of the N positions of the signature is never greater than the maximum number of permutations possible P for the number T of intermediary positions.

10. The process of reversible generation of altered payment cards by a mathematical algorithm, according to claim 8, wherein the multiplier factor F only distributes the number resulting between the different possibilities in a uniform manner.

11. The process of reversible generation of altered payment cards by a mathematical algorithm, according to claim 8, wherein the decimal number obtained after the process of decimalisation is between 1 and P.

12. The process of reversible generation of altered payment cards by a mathematical algorithm, according to claim 1, wherein the permutation of the transaction signature comprises:

The decimalised value of the transaction signature is divided by the number of positions to be permuted T and to the remainder of said quotient is added 1, obtaining a value between 1 and T, which determines the position of the original payment card number, whose value is transferred to the first position on the permuted payment card number;

The quotient above is divided by (T−1) and then 1 is added obtaining a value between 1 and T−1 that determines the position to be permuted of the remaining number of the original payment card (once the permuted position of the previous step has been eliminated), whose value is transferred to the second position on the number of the altered payment card;

This process continues until there are no more positions on the original payment card, iteratively T times.

13. The process of reversible generation of altered payment cards by a mathematical algorithm, according to claim 1, wherein obtaining the month of the altered payment card the following operative phases comprising:

The result of the decimalisation of the signature is divided by 12 and then 1 and the month of the original card are added, This is divided by 12 and 1 is added to the result, obtaining the month of the altered payment card.

14. The process of reversible generation of altered payment cards by a mathematical algorithm, according to claim 1, wherein obtaining the year of the altered payment card the following operative phases comprises:

The result of the decimalisation of the signature is divided by the year window A starting from the current year that can be obtained from the process and then 1 and the year of the original card are added, This is divided again by A and 1 and the last two digits of the current year are added, thus obtaining the year of the altered payment card.

15. The process of reversible generation of altered payment cards by a mathematical algorithm, according to claim 14, wherein the year window A is 15.

16. The process of reversible generation of altered payment cards by a mathematical algorithm, according to claim 1, wherein the decimalisation of the transaction signature in the processing centre of the issuing body comprises the same operative phases as the decimalisation of the transaction signature in the authentication server of the issuing body.

17. The process of reversible generation of altered payment cards by a mathematical algorithm, according to claim 1, wherein the permutation of the transaction signature in the processing centre of the issuer comprises the same operative phases as the permutation of the transaction signature in the authentication server of the issuer.

18. The process of reversible generation of altered payment cards by a mathematical algorithm, according to claim 1, wherein to obtain the month of the original payment card in the processing centre of the issuer the same operative phases are necessary as those necessary to obtain the month of the altered payment card in the authentication server of the issuer.

19. The process of reversible generation of altered payment cards by a mathematical algorithm, according to claim 1, wherein to obtain the year of the original payment card in the processing centre of the issuer the same operative phases are necessary as those necessary to obtain the year of the altered payment card in the authentication server of the issuer.

* * * * *